United States Patent
Helbig

(10) Patent No.: US 6,253,245 B1
(45) Date of Patent: Jun. 26, 2001

(54) TRANSMISSION SYSTEM WITH BUFFER BETWEEN INDEPENDENTLY CONTROLLED DATA PATHS

(75) Inventor: Tobias Helbig, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/065,966

(22) Filed: Apr. 24, 1998

(30) Foreign Application Priority Data

Apr. 25, 1997 (DE) ................................................ 197 17 548

(51) Int. Cl.$^7$ ...................................................... G06F 15/16
(52) U.S. Cl. ......................... 709/232; 709/232; 709/233; 709/234; 709/235
(58) Field of Search ..................... 709/232, 233, 709/234, 235

(56) References Cited

U.S. PATENT DOCUMENTS

| | | | | |
|---|---|---|---|---|
| 5,220,635 | * | 6/1993 | Kagaya ................................... | 710/52 |
| 5,740,468 | * | 4/1998 | Hirose .................................... | 395/877 |
| 5,913,028 | * | 6/1999 | Wang et al. .......................... | 709/203 |
| 5,968,128 | * | 10/1999 | Lauck et al. ........................... | 709/232 |

OTHER PUBLICATIONS

Helbig T et al: Synchronisation multimedialer datenstroeme IT+TI Informationstechnik Und Technische Informatik, Bd. 37, Nr. 4, Aug. 1, 1995, Seiten 18–25, XP000597623 *Abbildungen 1–5*Abstaz 2–5*.

Rothermel K et al: Clock Hierarchies: An Abstraction for Grouping and Controlling Media Streams IEEE Journal on Selected Areas in Communication, Bd. 14, Nr. 1, Jan. 1, 1996, Seiten 174–184, XP000548820 *Abbildungen 1,3,4, 6–12* Absatz 1–5*.

"Avid AirPlay MP", Avid Technology Inc., 1966, p. 2–6.

* cited by examiner

*Primary Examiner*—Krisna Lim
(74) *Attorney, Agent, or Firm*—Peter L. Verdonk

(57) ABSTRACT

A transmission system includes multiple network elements for the transmission of a plurality of data units from at least one network element having a data source, to at least one further network element that has a data sink and a data buffer. Transmission systems of this kind are used for the composition of news items in a news broadcast studio or for the remote transmission of video sequences. Very strict requirements are then imposed on the data transmission, notably as regards the temporal control of the data transmission, in order to achieve real-time, interference-free data output via the data sink. Therefore, means is provided for temporal control of the data transmission from the data source to the data buffer, and for the temporal control, independently of the former, of the data transmission from the data buffer (11) to the data sink.

9 Claims, 2 Drawing Sheets

TRANSMISSION SYSTEM WITH BUFFER BETWEEN INDEPENDENTLY CONTROLLED DATA PATHS

Figure 1:
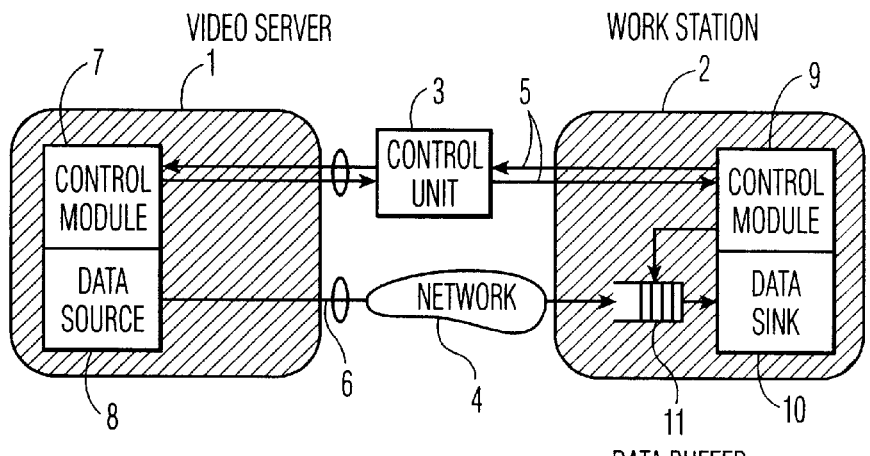

The invention relates to a transmission system, including a plurality of network elements for the transmission of a plurality of data units from at least one network element, including a data source, to at least one further network element which includes a data sink and a data buffer.

Such a transmission system is known from "Avid AirPlay MP", Avid Technology Inc., 1966, p.2.

Transmission systems of this kind are used, for example in news stations so as to form high-quality news items, for example for television news broadcasts. Available news material (for example, audio/video data, text contributions, images, ...) is stored in different, interconnected network elements (servers, workstations, data memories) at various locations in a network. In order to do research in the available news material and to compose the news items, which must satisfy severe quality requirements and are usually formed under pressure of time because of topicality, the transmission system must provide given functionalities. They include notably the single step mode, in which individual data units (for example, single images of a video sequence) are requested by the user, and the streaming mode, in which continuous output of a sequence of data units is requested and the user determines only start and stop but not the temporal control of the continuous data output. Moreover, data units are stored in different network elements and often additional requirements are imposed, for example the temporally simultaneous output of the same data at different network elements.

It is an object of the invention to provide an improved transmission system on the basis of the transmission system described above.

This object is achieved according to the invention in that there are provided first means for the temporal control of the data transmission from the data source to the data buffer and second means for the temporal control of the data transmission from the data buffer to the data sink.

It is thus achieved that less severe quality requirements may be imposed on the data source, on its temporal control and on the data transmission paths of the transmission system (from the data source to the data buffer). Nevertheless, real-time data output to the data sink is still possible. The data transmission from the data source to the data buffer takes place independently after the start, without it being necessary to call the data units individually. Small temporal disturbances of this data transmission do not affect the data transmission from the data buffer to the data sink, since this data transmission is performed under own, separate temporal control. Because this data transmission path is only very short, hardly any disturbances can occur, so that the real-time data output by the data sink is ensured. If only the data transmission from the data buffer to the data sink were temporally controlled, but not the data transmission from the data source to the data buffer, there would be a problem in that in the event of simultaneous access to the same data of the same data source by several users, the data source would be overloaded by the plurality of data requests. In a transmission system in which the data transmission were temporally controlled directly from the data source to the data sink, very severe quality requirements would have to be imposed on the data source and its temporal control. Moreover, in such a transmission system the critical data path from the data source, via the network, to the data sink would be comparatively long, so that delays and disturbances could readily occur during the data transmission.

The first means in an embodiment of the invention includes a data source control module for controlling the data source, the data source control module supplying a respective control instruction to the data source for the transmission of data units from the data source to the data buffer, the second means including a data sink control module for controlling the data sink and the data buffer, the data sink control module supplying a respective control instruction to the data buffer for the transmission of data units from the data buffer to the data sink. The control modules independently control the associated elements in conformity with a data stream control protocol. Each network element provided with a data source or a data sink includes such a control module for each data source or data sink.

A further embodiment which is based thereon is provided with a control unit for outputting a start instruction to the control module in order to start the data transmission from a network element to a further network element. The control modules are connected to the control unit via control leads and receive the instructions for starting and stopping the data transmission therefrom. In this further embodiment, therefore, the control unit need apply only a single start instruction to each control module involved, which control modules then independently take over the temporal control of the associated data source or data sink of the associated data buffer. Analogously, for the stopping of the data transmission the control unit applies merely a single stop instruction to each control module. This offers the advantage that the construction of the control unit, which may be configured as a separate network element or be implemented in one of the other network elements, may be simpler and that the data sources or data sinks and data buffers can always be controlled independently of one another.

In a preferred embodiment of the invention, in order to control the data buffer the data sink control module is constructed in such a manner that for data output the data is transmitted from the data buffer to the data sink at equal distances in time. Temporally exact output of data in conformity with a predetermined temporal order is thus achieved, for example in real time.

The control unit in a preferred embodiment of the invention is arranged to output start instructions to the data sink control module in order to synchronize the data output at a plurality of data sinks, each of which includes an associated data buffer, in such a manner that the data transmission from the data buffers to the data sinks is started simultaneously. The data sinks with the associated data buffers can then be arranged in the same or in different network elements. In this embodiment the data transmission from the data source to the data buffer can take place simultaneously or temporally offset relative to an arbitrary instant prior to the synchronized data transmission from the data buffers to the data sinks. The control unit initially applies a start instruction to the data sink control module, requesting it to start the data transmission from the data buffers to the data sinks simultaneously. The control unit then applies various parameters to the data sink control module, said parameters providing timing of the control module and enabling the synchronized data output.

In a further embodiment which is based thereon the control unit for controlling the data source control module is constructed in such a manner that the data units are transmitted from the data source to the data buffer in a temporally offset manner. This enables a reduction of the size of the data buffer and also a mitigation of the temporal requirements imposed on the transmission lines from the data source to the data buffer.

The invention also relates to a network element which includes a data source or a data sink and a data buffer for a transmission system of the kind set forth, the network element including means for temporal control of the data transmission from the data source to the data buffer or from the data buffer to the data sink. These means can be implemented in hardware as well as in software.

The invention also relates to a control unit for a transmission system of the kind set forth which is constructed in such a manner that the data transmission from the data source to the data buffer and the data transmission from the data buffer to the data sink can both take place in an independent, temporally controlled manner. The control unit may also be implemented in hardware or in software and be localized in one network element or be distributed between several network elements.

The invention also relates to a method for the transmission of data in a transmission system of the kind set forth in which individual data units are transmitted in a temporally controlled manner from the data source to the data buffer and subsequently in a temporally controlled manner from the data buffer to the data sink.

Figure 2:
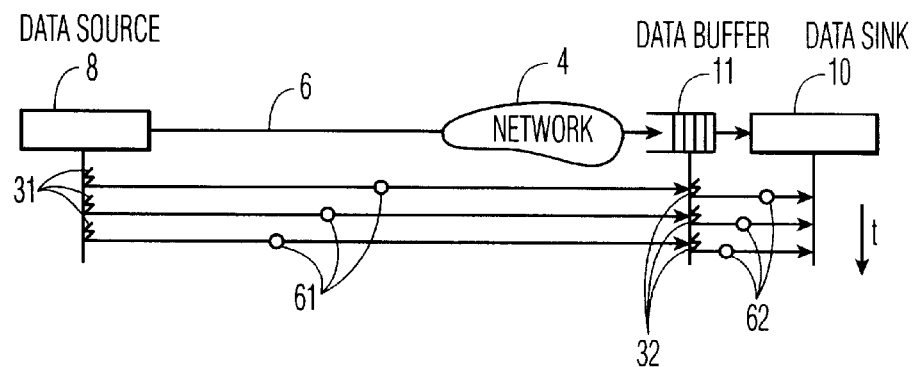
Figure 3:
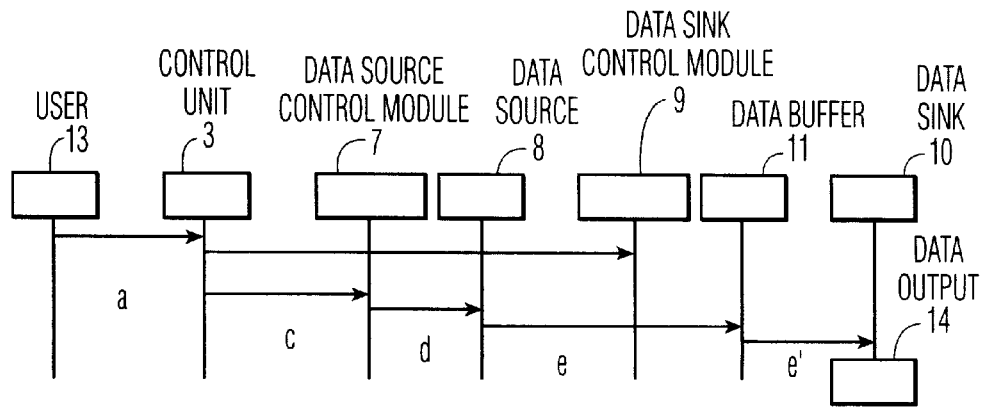
Figure 4:
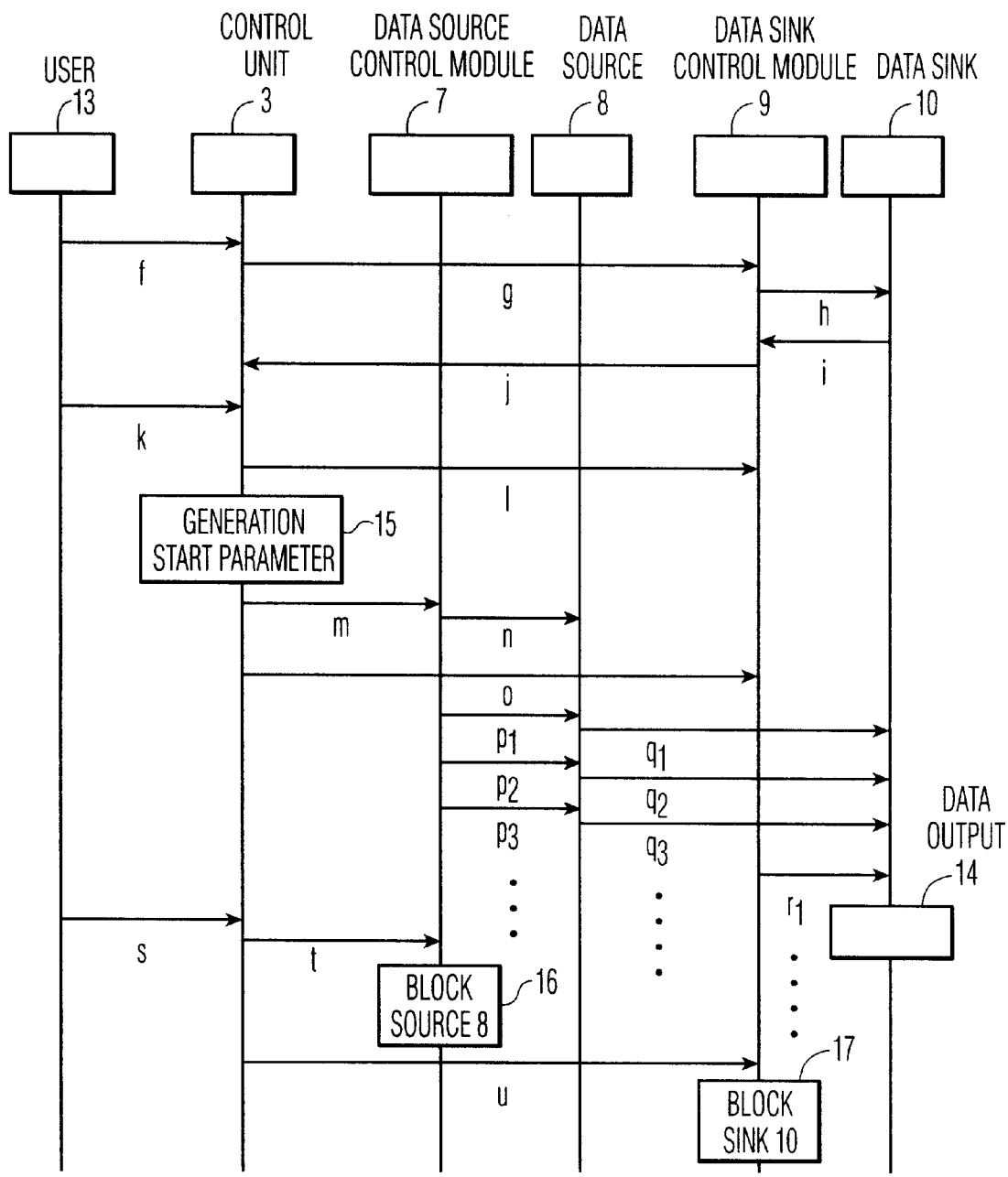

The invention will be described in detail hereinafter with reference to the drawing. Therein:

FIG. 1 shows a simple block diagram of a transmission system according to the invention which includes two network elements, FIG. 2 shows a flow chart of the data transmission in the transmission system according to the invention, FIG. 3 shows a protocol flow chart for the single step mode, and FIG. 4 shows a protocol flow chart for the streaming mode.

FIG. 1 shows a transmission system with two network elements, for example a video server 1, storing video data, and a workstation 2 in which functions such as researching on data material and editing of news items are performed. The video server 1 includes a data source 8 which may be, for example a memory unit (for example, a hard disk) for the storage of the video data, and a data source control module 7 which is associated with the data source 8. The workstation 2 includes a data sink 10 which may be, for example a memory unit or an output unit, a data sink control module 9 which is associated with the data sink 10, and a data buffer 11 for the intermediate storage of data. A central control unit 3, which may be located at an arbitrary point within the transmission system, for example also in the network elements 1 and 2, communicates with the control modules 7 and 9 via bidirectional control leads 5. The network elements 1, 2 also communicate via one or more unidirectional data leads 6 which may extend throughout the symbolically represented network 4 and via which data can be transmitted from the data source 8 to the data buffer 11 and further to the data sink 10. Evidently, the transmission system also includes a plurality of further network elements 1, 2 which are interconnected via control leads 5 and data leads 6 in the manner shown.

FIG. 2 shows a flow chart of the continuous data transmission in a transmission system according to the invention. The transmission of the data units 61 from the data source 8 to the data buffer 11 is temporally controlled (symbolically denoted by arrows 31) and also the subsequent transmission of the data units 62, corresponding to the data units 61, from the data buffer 11 to the data sink 10 (arrows 32). The temporal control 32 is uncoupled from the temporal control 31. The time axis t illustrates the temporally successive transmission of a plurality of single data units 61 or 62. The critical data path, on which disturbances could occur, now extends only from the data buffer 11 to the data sink 10. It is only the data transmission therebetween that need satisfy severe temporal requirements so as to ensure continuous data output via the data sink 10 (for example, a monitor) or further processing in the data sink 10. When the data buffer 11 is appropriately proportioned, the requirements imposed on the data leads 6 and the data source 8 can be reduced. Moreover, no instructions (data requests) are then required for requesting each time a single data unit 61 from the data source 8. This precludes overloading of the network 4 in the event of a plurality of data requests from different data sinks 10 for the same data source 8. Data flow control protocols for the data transmission in a transmission system according to the invention will be described in detail hereinafter with reference to the FIGS. 3 and 4.

FIG. 3 shows a flow chart protocol for the single step output mode. The user 13 first issues the instruction to perform a single step, for example to the workstation 2, for example an instruction to reproduce a single image in a given position in a video sequence. This instruction is transported to the control unit 3 of the data flow control protocol (step a). The control unit 3 first instructs the data sink control module 9 to empty the data buffer 11 (b). Subsequently, the data source control module 7 receives the instruction (c) to activate the data source 8 and to generate the requested data unit (d). During the steps (a), (c), (d), the respective position parameters, describing the position of the requested data unit, are communicated. The data source then generates the requested data unit; for example, it reads the corresponding data from the storage element (for example, a hard disk) and transfers the data unit to the data buffer (e) which transports the data unit further to the data sink 10 (e'). Via an output unit 14, for example a monitor, the data unit is then output directly to the user 13.

FIG. 4 shows a protocol for the data streaming mode. The user 13 first issues the request for the continuous data output. This request is applied to the control unit 3 (f). A series of parameters which describe the data to be output, for example a video sequence, is then set. To this end, the user 13 also sets the temporal parameters. The parameters describing the requested data stream, such as notably the starting position and the end position, the length of the data units, the output rate, etc., are made accessible by the control unit 3 which, however, is not shown herein. Moreover, the control unit 3 requests the data sink control module 9 (g) to read from the data sink 10 the parameter value of the internal delay (period of time elapsing between the transfer of a data unit at the data sink 10 and the actual output of the data unit) (h, i) and to transport it to the control unit 3 (j). The user 13 can then issue the instruction to start the data output at a given position of the data stream; this information is applied to the control unit 3 (k) which instructs the data sink control module 9 to empty the data buffer (11, not shown in FIG. 4)

(l). After the control unit 3 has generated the necessary start parameter (step 15), it instructs the data source control module 7 (m) to start the data transmission from the data source 8 to the data sink 10 (or the preceding data buffer) immediately. To this end, the necessary parameters are transferred from the data source control module 7 to the data source 8 (n). The control unit 3 also instructs the data sink control module 9 to start the data output at the data sink 10 (o), be it offset in time. This time offset consists of the transmission delay times (period of time elapsing between the issuing of the start instruction from the control unit 3 to the control module 7 until the arrival of the first data unit at the data sink 10 and the preload buffer level), minus the internal time delay of the data sink 10. Subsequently, the data source 8 is instructed, by way of single control instructions from the data source control module 7 ($p_1$, $p_2$, $p_3$), to transfer each time one data unit to the data sink 10 at predetermined time intervals ($q_1$, $q_2$, $q_3$). The data output itself (block 14) of the individual data units is activated by control instructions applied to the data sink 10 ($r_1$) by the data sink control module 9. For data output the data sink 10 successively takes up each time one data unit from the data buffer (not shown).

In order to stop the data output, the user 13 enters a stop instruction which is applied to the control unit 3 (s). This unit transports the stop instruction to the control modules 7, 9 (t, u), which immediately block the data source 8 and the data sink 10, respectively (steps 16, 17).

A stop position may also have been set already before the start of the data transmission. The data source control module 7 then applies an appropriate message to the control unit 3 when the stop position is reached or when the start or end position of the data stream to be transmitted is reached. Moreover, at the end of the last data unit a mark is set, said mark being recognized by the data sink control module 9 which deactivates the data sink 10 in response thereto.

With regard to contents the data output can take place in an arbitrary direction and at an arbitrary speed. A slowed down data output can take place in an arbitrary direction and at an arbitrary speed. A slower data output is achieved, for example by multiple, successive output of a data unit, whereas an accelerated data output is achieved by omission of data units.

The transmission system according to the invention is also suitable for achieving a synchronized transmission of different data streams from different data sources to one or more (different) data sinks. For example, an audio stream and a video stream must be applied in synchronism to a network element by two data sinks. To this end, an own set of parameters is generated for each data stream. When different data streams are to be output in synchronism, the data sources are controlled in such a manner that the data units of different data streams are transmitted with a time offset corresponding to possibly different internal delays of the data sinks. This reduces the capacity required for the data buffer of the data sinks. If a plurality of data streams on different network elements are to be output in synchronism, it is necessary to synchronize the system clocks of the associated network elements; this can be performed by means of known means.

In order to ensure that the data units are output in the correct order, a counter can be added to each data unit during the transmission from the data source to the data buffer, or to the data sink, said counter being incremented after each data unit.

The invention can be used not only for a message processing system but also, for example, for remote medical diagnosis where video sequences (for example, ultrasonic images of the heart) are to be studied simultaneously by a number of physicians in different locations. The invention can also be used for the transmission of data in the internet or in communication networks (for example, video conferences, video telephony).

I claim:

1. A data transmission system with multiple network elements and operative to control the transmission of data from at least a first one of the network elements to at least a second one of the network elements, wherein:

the first network element includes a data source;

the second network element includes a data sink and a data buffer;

the system has a first controller for the temporal control of the data transmission from the data source to the data buffer via a first transmission path;

the system has a second controller for the temporal control of the data transmission from the data buffer to the data sink via a second transmission path functionally substantially shorter than the first transmission path; and the first and second controllers operate independently of one another.

2. A transmission system as claimed in claim 1, wherein:

the first controller includes a data source control module for controlling the data source;

the data source control module supplies a control instruction to the data source for the transmission of data units from the data source to the data buffer;

the second controller includes a data sink control module for controlling the data sink and the data buffer; and the data sink control module supplies a respective control instruction to the data buffer for the transmission of data units for the data buffer to the data sink.

3. A transmission system as claimed in claim 2, comprising a control unit for outputting a start instruction to the control module in order to start the data transmission from the first network element to the second network element.

4. A transmission system as claimed in claim 2, wherein, in order to control the data buffer, the data sink control module is constructed in such a manner that for data output the data is transmitted from the data buffer to the data sink at equal distances in time.

5. A transmission system as claimed in claim 3, comprising a plurality of respective data sinks, each of which comprising a respective data buffer, the control unit being arranged to output start instructions to the data sink control unit in order to synchronize the data output at the plurality of respective data sinks in such a manner that the data transmission from the respective data buffers to the respective data sinks is started simultaneously.

6. A transmission system as claimed in claim 5, wherein the control unit for controlling the data source control module is constructed in such a manner that the data units are transmitted from the data source to the respective data buffers in a temporally offset manner.

7. The system of claim 3, comprising a plurality of respective data sinks, each of which comprising a respective data buffer, the control unit being arranged to output start instructions to the data sink control unit in order to synchronize the data output at the plurality of respective data sinks in such a manner that the data transmission from the data sink to the respective data buffers is temporally offset relative to an instant prior to the data transmission simultaneously started from the respective data buffers to the respective data sinks.

8. A control unit for a transmission system which includes a plurality of network elements for the transmission of a plurality of data units from a first one of the plurality of network elements, including a data source, to at least a further one of the plurality of network elements which includes a data sink and a data buffer, wherein the control unit is constructed in such a manner that the data transmission from the data source to the data buffer and the data transmission from the data buffer to the data sink take place in an independent, temporally controlled manner.

9. A method for the transmission of a plurality of data units from at least one network element, including a data source, to at least one further network element which includes a data sink and a data buffer, wherein the method comprises:

transmitting individual data units in a temporally and independently controlled manner from the data source to the data buffer; and subsequently transmitting the individual data units in a temporally and independently controlled manner from the data buffer to the data sink.

* * * * *